(12) United States Patent
Hartzell et al.

(10) Patent No.: US 7,544,403 B2
(45) Date of Patent: *Jun. 9, 2009

(54) BAG HAVING AN IMPROVED HEAT SEAL CLOSURE AND ASSOCIATED METHODS

(75) Inventors: Mark Hartzell, Bloomsburg, PA (US); Alfred A. McLellan, Inman, SC (US); Sarajane Johnson, Simpsonville, SC (US); Roseann Woodham-Grant, Greenville, SC (US); Lesley M. Millslagle, Roebuck, SC (US); Mary K. Cash, Wellford, SC (US)

(73) Assignee: Exopack, LLC, Spartanburg, SC (US)

( * ) Notice: Subject to any disclaimer, the term of this patent is extended or adjusted under 35 U.S.C. 154(b) by 384 days.

This patent is subject to a terminal disclaimer.

(21) Appl. No.: 11/265,946

(22) Filed: Nov. 3, 2005

(65) Prior Publication Data

US 2006/0073292 A1    Apr. 6, 2006

Related U.S. Application Data

(63) Continuation of application No. 10/290,681, filed on Nov. 8, 2002, now Pat. No. 6,979,482.

(51) Int. Cl.
*B32B 1/06* (2006.01)
(52) U.S. Cl. ..................................................... 428/34.3
(58) Field of Classification Search ................ 428/35.7, 428/36.9, 36.92, 34.3; 383/61.2, 64, 109, 383/120, 119
See application file for complete search history.

(56) References Cited

U.S. PATENT DOCUMENTS

| | | | |
|---|---|---|---|
| 4,493,127 A | 1/1985 | Blanke, Jr. et al. | |
| 4,946,289 A | 8/1990 | Bolling et al. | |
| 4,952,441 A | 8/1990 | Bose et al. | |
| 4,994,324 A | 2/1991 | Bose et al. | |
| 5,038,009 A | 8/1991 | Babbitt | |
| 5,051,284 A | 9/1991 | Johansson et al. | |
| 5,171,594 A | 12/1992 | Babbitt | |
| 5,345,399 A | 9/1994 | Collins | |
| 5,482,376 A | 1/1996 | Moseley et al. | |
| 5,488,220 A | 1/1996 | Freerks et al. | |

(Continued)

FOREIGN PATENT DOCUMENTS

GB    2 351 039 A    12/2000

(Continued)

*Primary Examiner*—Michael C Miggins
(74) *Attorney, Agent, or Firm*—Stoel Rives LLP

(57) ABSTRACT

A multiwall bag having a slider zipper and fin combination and methods of forming same are provided. The multiwall bag, for example, can include a tube body. A bag seal zone can be formed in the tube body, and a combination fin member, zipper track, and zipper block can be connected to an end of the tube body in the bag seal zone. The other end of the tube body can be filled with product so that the bag seal zone operates as a constructive bottom during filling. Then, the end of the tube body through which product is filled can be closed and sealed to provide a bag filled with product. The method can include forming a tube body, sealing inner surfaces of the tube body to define a bag seal zone, and connecting a combination fin member, zipper track, and zipper block to the bag seal zone.

12 Claims, 8 Drawing Sheets

U.S. PATENT DOCUMENTS

| | | |
|---|---|---|
| 5,529,396 A | 6/1996 | Pryor et al. |
| 5,558,438 A | 9/1996 | Warr |
| 5,560,296 A | 10/1996 | Adams |
| 5,593,229 A | 1/1997 | Warr |
| 5,601,369 A | 2/1997 | Moseley et al. |
| 5,611,626 A | 3/1997 | Warr |
| 5,728,037 A | 3/1998 | Pryor et al. |
| 5,770,839 A | 6/1998 | Ruebush et al. |
| 5,871,790 A | 2/1999 | Monier et al. |
| 5,919,535 A | 7/1999 | Dobreski et al. |
| 6,019,713 A | 2/2000 | Scypinski et al. |
| 6,046,443 A | 4/2000 | Ackerman et al. |
| 6,065,871 A | 5/2000 | Warr |
| 6,213,644 B1 | 4/2001 | Henderson et al. |
| 6,231,232 B1 | 5/2001 | Warr |
| 6,286,999 B1 | 9/2001 | Cappel et al. |
| 6,299,351 B1 | 10/2001 | Warr |
| 6,374,461 B1 | 4/2002 | Gober et al. |
| 6,375,981 B1 | 4/2002 | Gilleland et al. |
| 6,376,035 B1 | 4/2002 | Dobreski et al. |
| 6,402,379 B1 | 6/2002 | Albright |
| 6,439,770 B2 | 8/2002 | Catchman |
| 6,528,088 B1 | 3/2003 | Gilleland et al. |
| 6,609,999 B2 | 8/2003 | Albright |
| 6,893,686 B2 | 5/2005 | Egan |
| 2004/0038792 A1 | 2/2004 | Albright |
| 2004/0091648 A1 | 5/2004 | Hartzell et al. |
| 2004/0136616 A1 | 7/2004 | Allen et al. |
| 2004/0137206 A1 | 7/2004 | Pettis |
| 2004/0175060 A1 | 9/2004 | Woodham et al. |
| 2004/0228547 A1 | 11/2004 | Hartzell et al. |
| 2005/0008736 A1 | 1/2005 | Egan et al. |

FOREIGN PATENT DOCUMENTS

| | | |
|---|---|---|
| WO | WO 00/53429 A1 | 9/2000 |
| WO | WO 01/94451 A2 | 12/2001 |

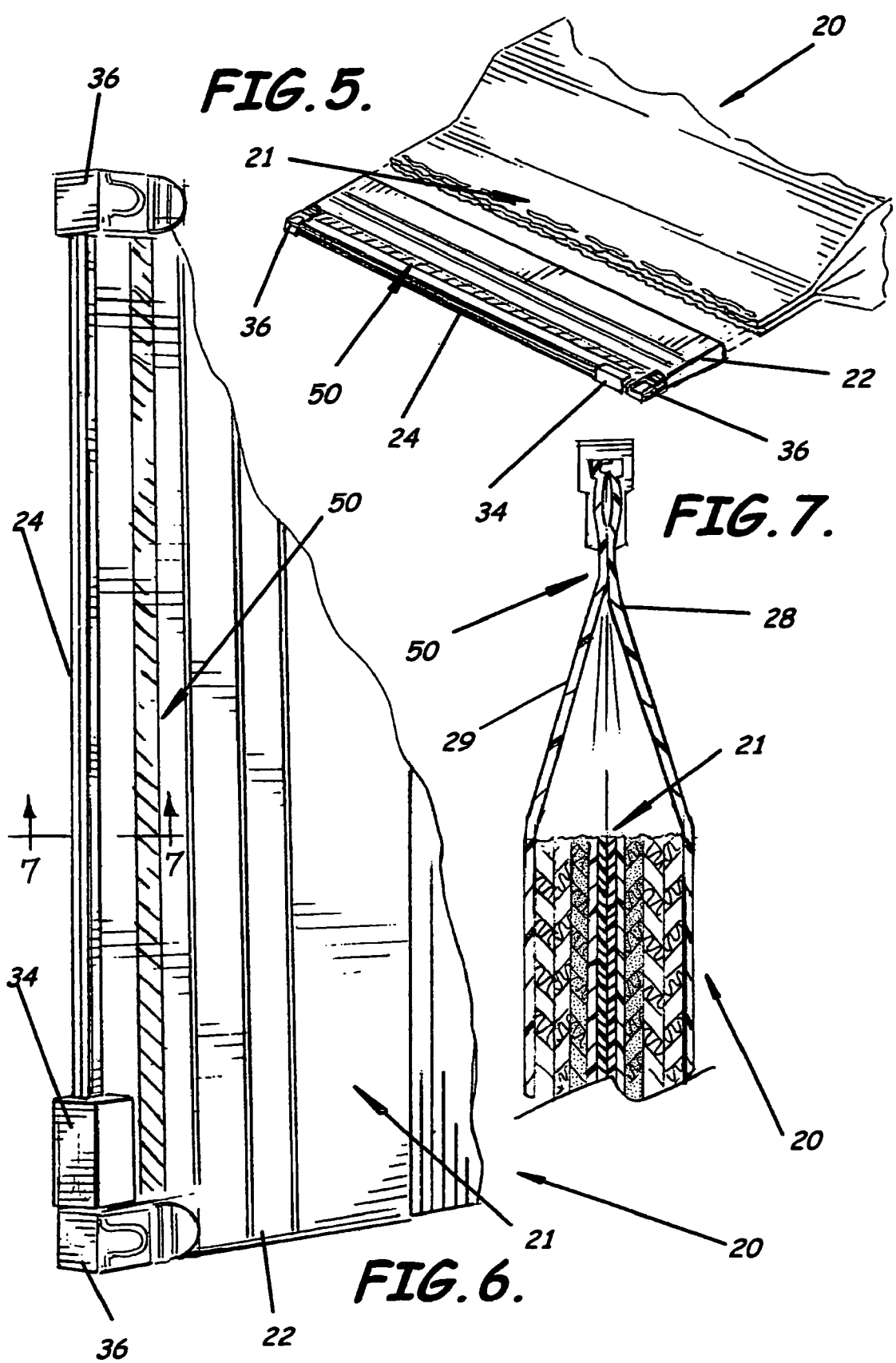

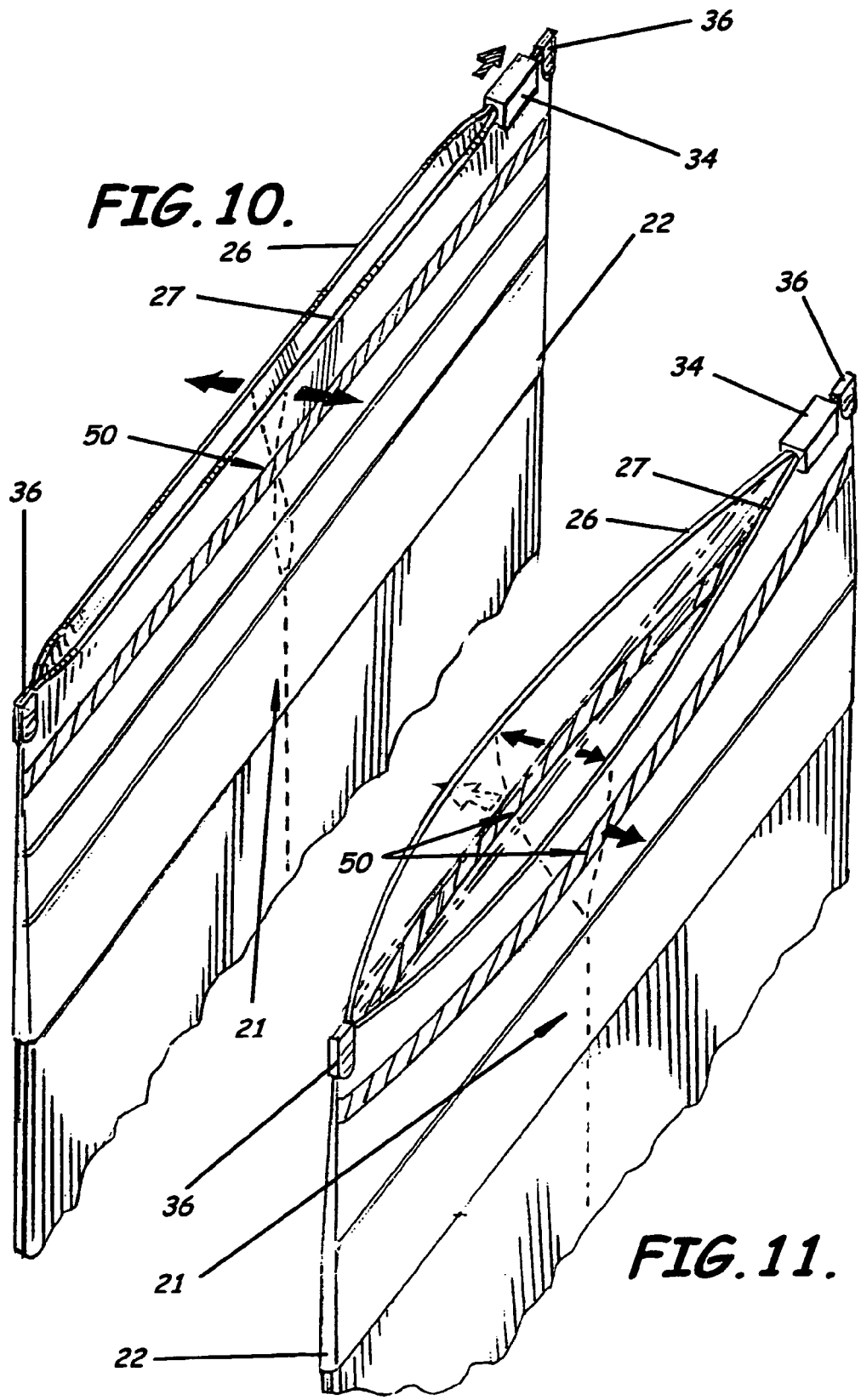

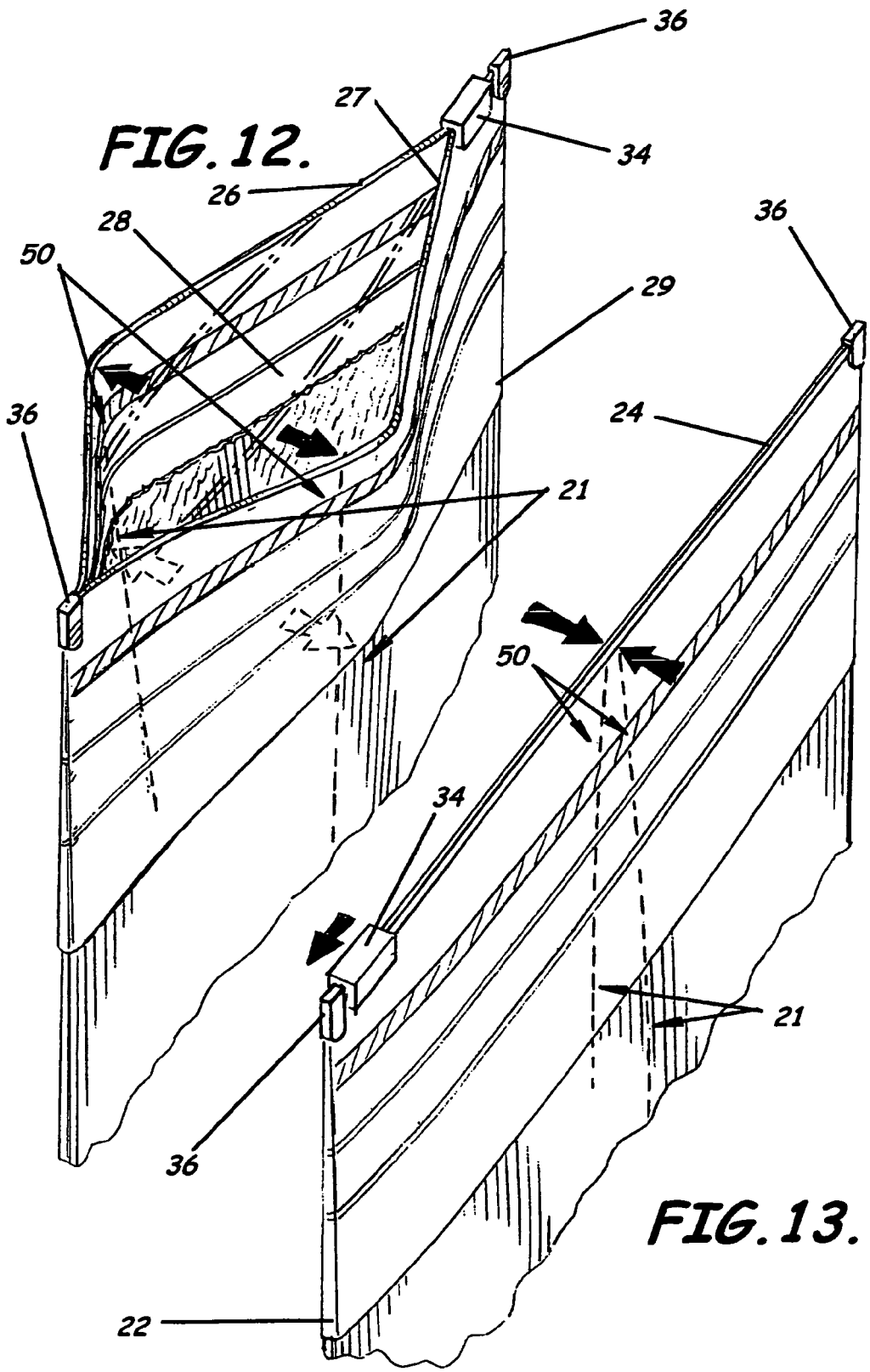

BAG HAVING AN IMPROVED HEAT SEAL CLOSURE AND ASSOCIATED METHODS

CROSS REFERENCE TO RELATED APPLICATIONS

This is a continuation patent application which claims priority to and the benefit of U.S. Application Ser. No. 10/290,681, filed Nov. 8, 2002, titled MULTI-WALL BAG HAVING SLIDER ZIPPER AND FIN COMBINATION AND ASSOCIATED METHODS, which is incorporated herein by reference in its entirety.

BACKGROUND OF THE INVENTION

Description of the Related Art

As more and more consumer products are packaged, the need for enhanced consumer end product packaging continues to grow. End product packaging not only has to keep the products fresh, the product packaging needs to protect the environment from the product contents and protect the product contents from the environment. The packaging must also be strong enough to hold materials of varying weights, without being damaged, in order to provide packaging for a vast array of consumer products. Of particular importance is the ease of access to the materials within the packaging. Another important aspect includes tamper resistance to prevent the likelihood of tampering with the contents within the bags.

To increase access to contents within a bag, others have developed many types of bags with many types of closures. Examples of user friendly bags can be found in U.S. Pat. No. 6,376,035 titled "Zipper Fins For Plastic Bags" by Dobreski et al. and U.S. Pat. No. 5,919,535 titled "Fins For Plastic Bags" by Dobreski et al. These plastic bags are provided with a zipper or a slider, a zipper track, and one or more fin members. The consumer can initially open the zippered bag, use a portion of the product, and then easily reclose the bag until the product is needed again. This zipper combination is easily operated and can withstand stronger forces applied thereto than zippers previously used on plastic bags. Applicants have recognized that these zipper combinations described in Dobreski are limited to plastic bags. Although plastic bags can provide adequate packaging for some products, they are simply not durable enough to provide adequate protection for many types of products.

Tampering with consumer goods has also become a problem throughout the years. Packaging producers have been developing better mechanisms to enable consumers to determine if the product within the packaging may have been subjected to some form of tampering or unwanted opening prior to customer purchase. Examples of bags with a tamper evident feature can be found in U.S. Pat. No. 6,286,999 by Catchman titled "Tamper-Evident Reclosable Bag" and U.S. Pat. No. 6,439,770 by Catchman titled "Reclosable Bags Having A Tamper-Evident Retaining Member Extending Through A Slider." These patents describe many types of devices that can be installed along the zipper track of zippered bags to determine if tampering has occurred. Examples include a removable cardboard, paper, or plastic member covering or adjacent to a zipper slider in the closed position and then attached to the bag in some way. If the zipper is moved, the removable member will show signs of tampering. Applicants have recognized that the tamper-evident features in the Catchman patents require the use of some additional element that has to be damaged in order to show signs of tampering.

SUMMARY OF THE INVENTION

In view of the foregoing, an embodiment of the present invention advantageously provides multiwall end product packaging that is tillable from the bottom and includes a bag seal zone with a slidable zipper assembly. In addition to the end product packaging, the present invention also advantageously provides methods of forming such bags. An embodiment of the present invention also advantageously provides a multiwall bag of tubular form having a tamper-evident feature which is integral with the bag. Further embodiments of the present invention advantageously provide user friendly bags capable of holding products of varying weights, that are strong and durable, that provide consumers with easy access to the products within the bags, and that have a dependable anti-tampering alert mechanism.

More particularly, a multiwall bag according to an embodiment of the present invention includes an inner tube, an outer tube, a bag seal zone, a fin member, a zipper track, and a zipper block. The inner tube preferably has at least one layer of a polymeric material. The inner tube includes an inner front wall region and an inner back wall region positioned to face opposite the inner front wall region. The outer tube preferably has at least one layer of paper material and is positioned to substantially surround outer surfaces of the inner tube. The outer tube has an open end region, a closed end region, an outer front wall region, and an outer back wall region. The closed end region is typically initially in an open position and is adapted to receive filling material therethrough. The closed end region is then sealingly closed to a closed position. The outer front wall region is positioned between the open end region and the closed end region. The outer back wall region is positioned between the open end region and the closed end region and is positioned to face opposite the outer front wall region.

The bag seal zone is formed adjacent the open end of the outer tube so that the at least one layer of polymeric material of inner surfaces of the inner front wall region of the inner tube abuttingly contacts and seals to inner surfaces of the inner back wall region of the inner tube.

The fin member is formed of a plastic material and is connected to the bag seal zone. The fin member extends substantially the entire lateral extent of and along the outer front and back wall regions. The fin member includes at least a pair of spaced-apart elongate fin strips positioned to face opposite each other.

The zipper track is connected to each of the pair of elongate fin strips of the fin member. The zipper track includes a first track strip and a second track strip. The first and second track strips are adapted to be positioned between an open position defined by the first and second track strips being spaced apart to allow access to inner portions of the bag and a sealingly closed position defined by the first and second track strips abuttingly contacting each other to prevent ready access to the inner portions of the bag.

The zipper block is slidably connected to the zipper track to allow the zipper block to slidably move along the zipper track and move the first and second track strips between the open position and the closed position. The fin member, the zipper track, and the zipper block together or in combination define a slider zipper and fin combination. The fin member of the zipper and fin combination can also include a fin seal zone associated with and positioned between the pair of fin strips and positioned adjacent the open end of the outer tube proximal to the zipper track. The fin seal zone can include a score line positioned between the fin strips so that initial opening of the zipper track allows the fin seal zone to be readily separated along the score line.

According to another embodiment of the present invention, the multiwall bag can be altered, for example, by forming a tube body having a plurality of material layers or with the inner tube and outer tube as described above. The tube body has at least one inner layer of polymeric material and at least one outer layer of paper material positioned to substantially surround outer surfaces of the inner layer of polymeric material. The tube body has a pair of opposing tube ends. An outer front wall region is positioned between the pair of opposing tube ends. An outer back wall region is positioned to face opposite the outer front wall region and between the pair of opposing tube ends.

In addition to the multiwall bottom fillable bags, the present invention also advantageously provides methods of forming a multiwall bag having a zipper associated therewith. A method of forming the multiwall bag includes laminating a plurality of layers of material. The plurality of layers preferably includes at least one layer of polymeric material and at least one layer of paper material. Once the layers of material are laminated, the layers are formed into a tube body. At least one layer of the polymeric material defines an inner surface of the tube body and the at least one layer of paper material defines an outer surface of the tube body. The tube body has a front wall and a back wall positioned to face opposite the front wall. An end portion of the inner surface of the front wall is sealed to an opposite facing end portion of the inner surface of the back wall to thereby define a bag seal zone. A combination of a fin member, a zipper track connected to the fin member, and a zipper block connected to the zipper track are connected to or attached to the bag seal zone of bag.

The method of forming the multiwall bag, for example, can be altered by supplying layers of materials that are already laminated according to the present invention. If the materials are already laminated, then the tube body can be formed without having to laminate the materials.

It is envisioned that the bottom fillable multiwall packaging end products of the present invention can be used for any type of product that requires easy access to the contents within and the strength of a multiwall bag. Such product uses include bags for various food items, pet food, charcoal, building materials, seed, lawn and garden supplies, and other uses as will be known to one skilled in the art and are to be considered within the scope of this invention.

BRIEF DESCRIPTION OF THE DRAWINGS

So that the manner in which the features and advantages of the invention, as well as others which will become apparent, may be understood in more detail, more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 5 is a fragmentary perspective view of a tube body with a bag seal zone being connected to a slider zipper and fin combination according to an embodiment of the present invention;

FIG. 6 is an enlarged perspective fragmentary view of a slider zipper and fin combination connected to the bag seal zone of a multiwall bag according to an embodiment of the present invention;

FIG. 7 is a fragmentary sectional view of a slider zipper and fin combination connected to the bag seal zone of a multiwall bag taken along line 7-7 of FIG. 6 according to an embodiment of the present invention;

FIG. 10 is a fragmentary perspective view of a multiwall bag having a zipper block opened and prior to breaking a seal within the bag seal zone according to an embodiment of the present invention;

FIG. 11 is a fragmentary perspective view of a multiwall bag being opened along a score line and the seal being opened within the bag seal zone according to an embodiment of the present invention;

FIG. 12 is a fragmentary perspective view of a multiwall bag having a zipper block and a bag seal zone in an open position according to an embodiment of the present invention;

FIG. 13 is a fragmentary perspective view of a multiwall bag having a zipper block in a closed position and a bag seal zone remaining in an open position according to an embodiment of the present invention.

DETAILED DESCRIPTION

The present invention will now be described more fully hereinafter with reference to the accompanying drawings which illustrate preferred embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. The prime notation, if used, indicates similar elements in alternative embodiments.

Figure 1:
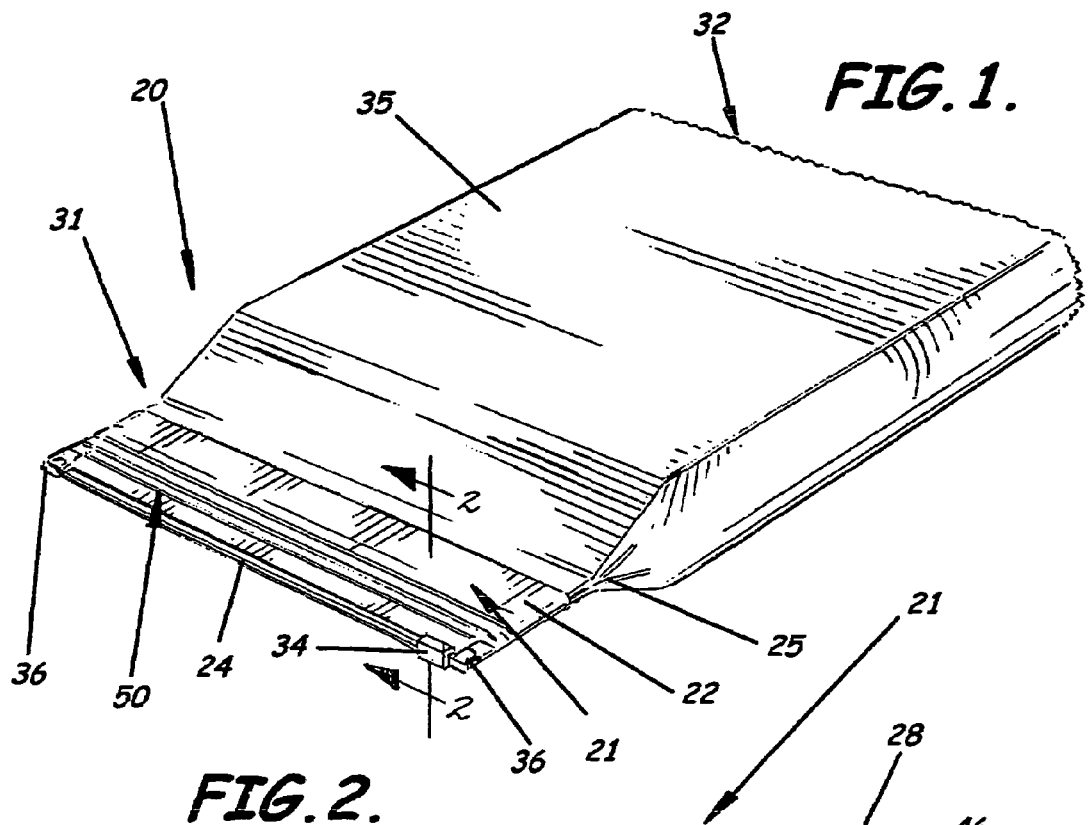
FIG. 1 is a perspective view of a multiwall bag with a bag seal zone and a slider zipper and fin combination according to an embodiment of the present invention.
Figure 2:
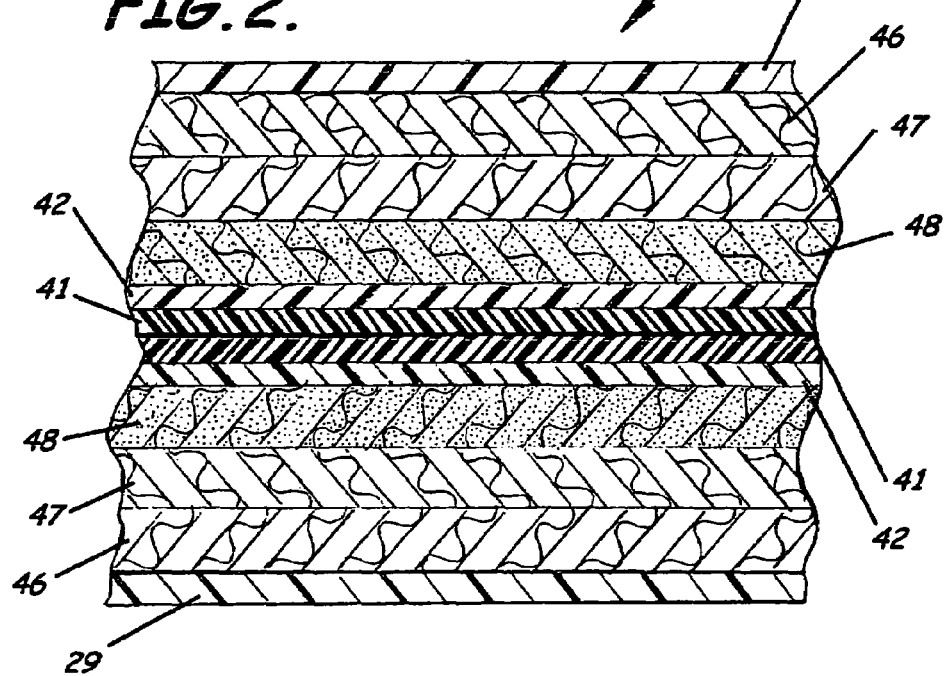
FIG. 2 is an enlarged fragmentary sectional view of a multiwall bag taken along line 2-2 of FIG. 1 according to an embodiment of the present invention.
Figure 3:
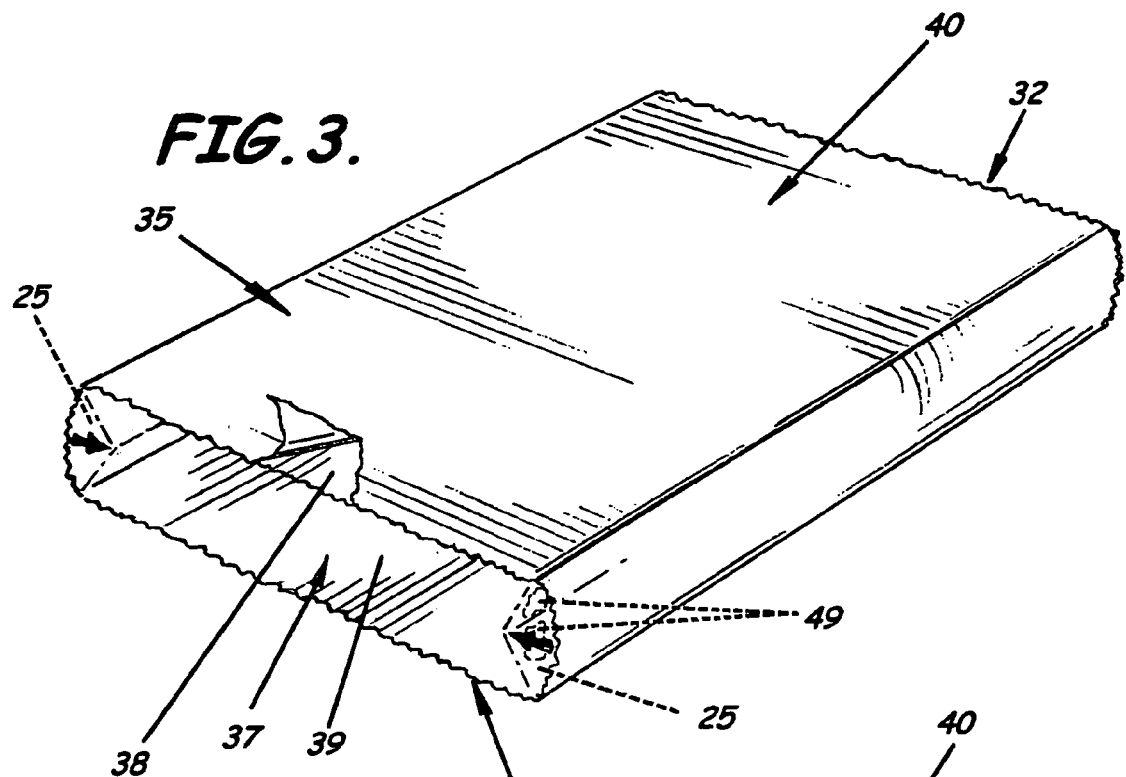
FIG. 3 is a perspective view of a tube body having a plurality of gussets formed therein according to an embodiment of the present invention.
Figure 9:
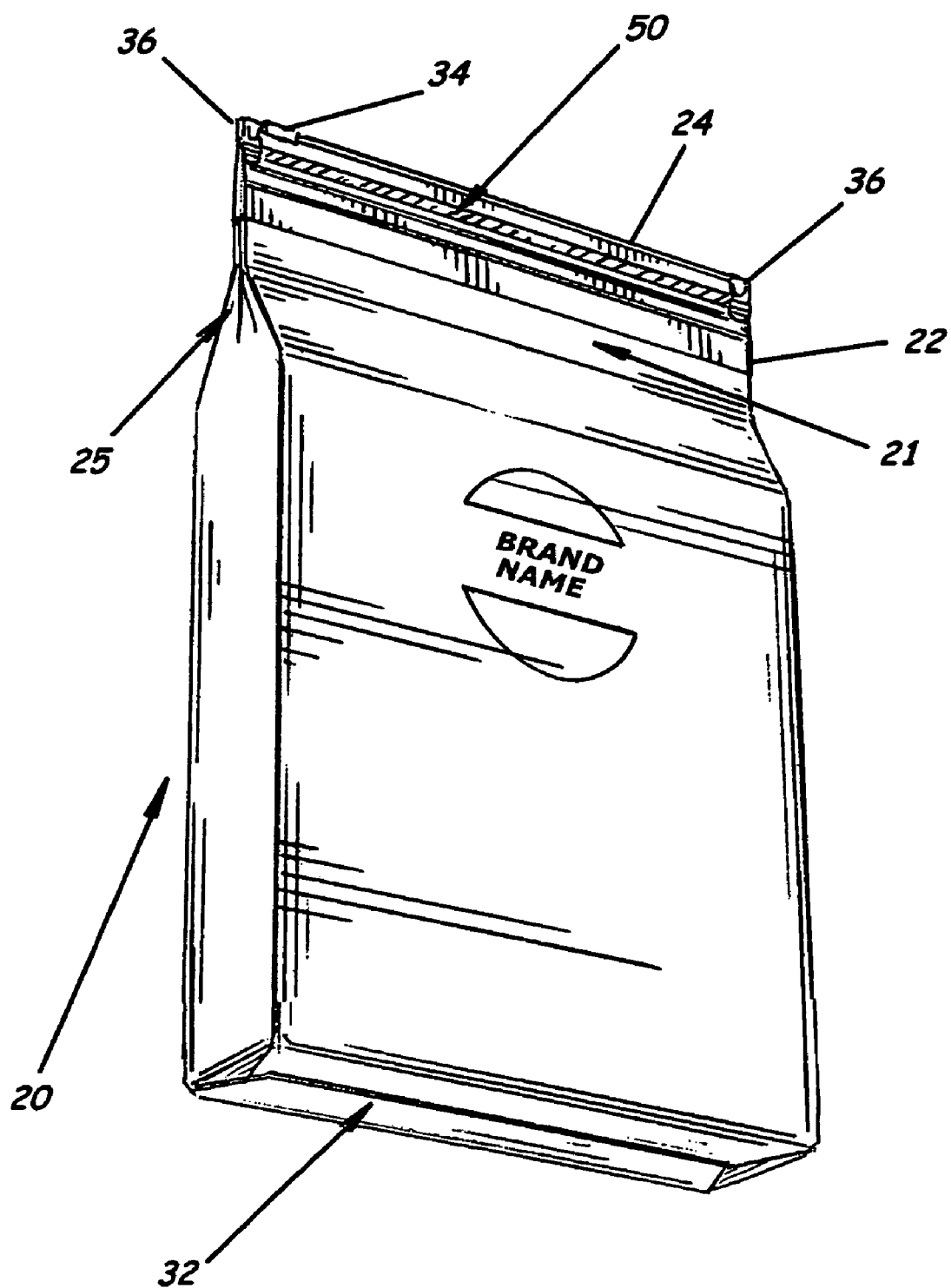
FIG. 9 is a perspective view of a multiwall bag having slider zipper and fin combination filled with a product and having a closed end region in closed position according to an embodiment of the present invention.

As illustrated in FIGS. 1-13, an embodiment of the present invention advantageously provides a multiwall bag 20 of tubular form. The multiwall bag 20 includes an inner tube 37, an outer tube 35, a bag seal zone 21, a fin member 22, a zipper track 24, and a zipper block 34. The inner tube 37 preferably has at least one layer of a polymeric material 41. The inner tube 37 includes an inner front wall region 38 and an inner back wall region 39 positioned to face opposite the inner front wall region 38 (see FIG. 3). The outer tube 35 preferably has at least one layer of paper material 46. The outer tube 35 is positioned to substantially surround outer surfaces of the inner tube 37. The outer tube 35 has an open end region 31, a closed end region 32, an outer front wall region 33, and an outer back wall region 34. The closed end region 32 is typically initially in an open position and is adapted to receive filling material F therethrough. The closed end region 32 is then sealingly closed to a closed position (see FIG. 9). The outer front wall region 33 is positioned between the open end region 31 and the closed end region 32 such as illustrated (see FIGS. 1-3). The outer back wall region 34 also is positioned between the open end region 31 and the closed end region 32 and is positioned to face opposite the outer front wall region 33.

The bag seal zone 21 is formed adjacent the open end 31 of the outer tube 35 (see FIGS. 1 and 3-4) so that the at least one layer of polymeric material 41 of inner surfaces of the inner front wall region 38 of the inner tube 37 abuttingly contacts and seals to inner surfaces of the inner back wall region 39 of the inner tube 37.

As shown in FIGS. 5 and 6, the fin member 22 is formed of a plastic material and is connected to or attached to the bag seal zone 21. This connection or attachment, for example, can be on the outer surface of the outer tube 35 such as by use of an adhesive material as illustrated or by attachment to one of the inner layer 41 of the inner tube 37 or to any layers 42, 47, 48 therebetween (see FIGS. 2, 5 and 7). The fin member 22 extends substantially the entire lateral extent of and along the outer front and back wall regions 33, 34. The fin member 22 can include at least a pair of spaced-apart elongate fin strips 28, 29 positioned to face opposite each other.

The zipper track 24 is connected to each of the pair of elongate fin strips 28, 29 of the fin member 22. The zipper track 24 includes a first track strip 26 and a second track strip 27. The first and second track strips 26, 27 are adapted to be positioned between an open position defined by the first and second track strips 26, 27 being spaced apart to allow access to inner portions of the bag 20 and a sealingly closed position defined by the first and second track strips 26, 27 abuttingly contacting each other to prevent ready access to the inner portions of the bag 20 (see FIGS. 10-13). The zipper block 34 is sidably connected to the zipper track 24 to allow the zipper block 34 to slidably move along the zipper track 24 and move the first and second track strips 26, 27 between the open position and the closed position. The fin member 22, the zipper track 24, and the zipper block 34 together and in combination define a slider zipper and fin combination.

According to another embodiment, construction for the multiwall bag 20 can be altered, for example, by forming a tube body 40 from a plurality of layers of material or by having the inner tube 37 and outer tube 35 as described above as understood by those skilled in the art. The tube body 40 has at least one inner layer 41 of polymeric material and at least one outer layer 46 of paper material positioned to substantially surround outer surfaces of the inner layer 41 of polymeric material. The tube body 40 has a pair of opposing tube ends 31, 32. An outer front wall region 33 is positioned between the pair of opposing tube ends. An outer back wall region 34 is positioned to face opposite the outer front wall region 33 and between the pair of opposing tube ends 31, 32.

As shown in FIG. 6, the multiwall bag 20 can include a pair of corner clips 36 each connected to an opposite end of the zipper track 24 and to the fin member 22. The corner clips 36, for example, advantageously help reduce the risk of damage to the zipper block 34 and can operate as a stop to the zipper block at opposing ends of the zipper track 24.

The bag seal zone 21 preferably includes a heat seal at least positioned between the slider zipper and fin combination and outer surfaces of the outer tube 35 so that inner surfaces of the polymeric material of the inner front wall region 38 are heatingly sealed to the inner surfaces of the polymeric material of the inner back wall region 39 (see FIGS. 4 and 9-13). When the bag 20 is filled from the closed end (see FIGS. 8-9), the heat seal enhances protection of the slider and zipper combination by operating as a stop region or constructive bottom for the filling material and thereby enhances filling performance of the bag 20. As will be understood by those skilled in the art, the heat seal preferably allows the inner surfaces of the inner front wall and inner back wall regions 38, 39 to pealingly separate and unseal the inner surfaces of the inner front and back wall regions 38, 39 without significant or substantial damage to the inner surfaces when initially opening the bag 20 through the slider zipper and fin combination (see FIGS. 10-13).

The multiwall bag 20 of an embodiment of the present invention also advantageously provides anti-tampering properties to indicate whether the bag 20 has already been opened. Once the bag seal zone 21 has been opened initially as shown in FIGS. 10-13, the bag seal zone 21 further remains unsealed even when the zipper block 34 is in the closed position as shown in FIG. 13. The inability to reseal the bag seal zone 21 as initially sealed indicates that initial opening has occurred and that tampering with the opening of the bag 20 may have occurred.

Various materials or chemical compounds can be used as the polymeric material of the inner layer 41 (or plurality of layers 41, 42) the inner tube 37. Preferably the polymeric material is selected from at least one of the following: polyethylene, polypropylene, nylon, ethylene vinyl acetate, ethylene vinyl alcohol, maleic anhydride grafted polyethylenes and propylenes, and polyesters. The polymeric material preferably enhances the effectiveness of the heat seal and yet reducing risk of damage to the polymeric material. Other suitable polymeric materials will be known to those skilled in the art and are to be considered within the scope of the present invention. As understood by those skilled in the art, the polymeric material is preferably formed by at least one of the following: extrusion, co-extrusion, lamination, and coating processes.

Oil and grease resistance is an important property for bags 20, particularly when containing various types of food products, including pet food. Oil and grease resistance protects the contents within the bag 20 from the outside, while also protecting the outside from the contents. In all embodiments of the present invention, the multiwall bag 20 can be constructed to provide oil and grease resistance to the bag 20. The multiwall bag 20 can be constructed so the inner tube 37 further has a second layer 42 formed of a grease resistant material (see FIG. 2). The second layer 42 preferably overlies the first layer 41 as illustrated. The at least one paper layer 46 of the outer tube 35 also can be a plurality of paper layers 46, 47, 48. The outer tube 35 further includes at least one grease resistant barrier 48 associated with the plurality of paper layers 46, 47, 48. The second layer 42 of the inner tube 37 can be constructed from at least one of the following materials: nylon, rubber, vinyl, and polymeric. The grease resistant barrier 48 of the outer tube 35 can be constructed by using a grease resistant coating, applying a chemical to at least one of the plurality of paper layers 46, 47, 48 or providing a separate non-paper material layer 48.

Figure 4:
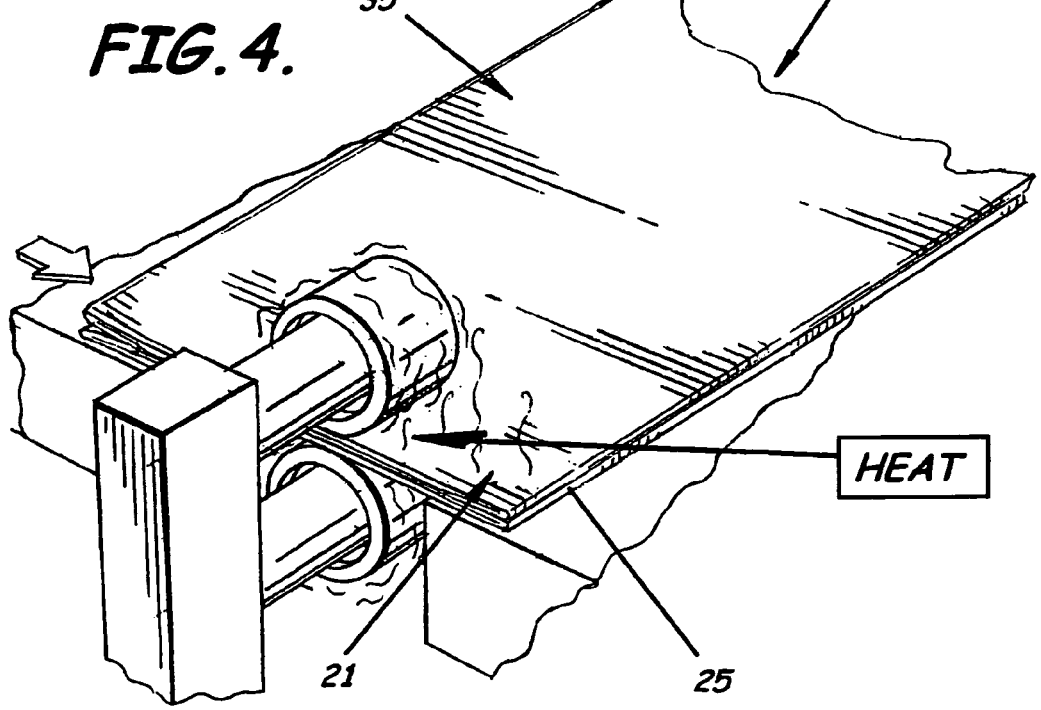
FIG. 4 is a fragmentary perspective view of heat being applied to a tube body to form a bag seal zone of a multiwall bag according to an embodiment of the present invention.
Figure 8:
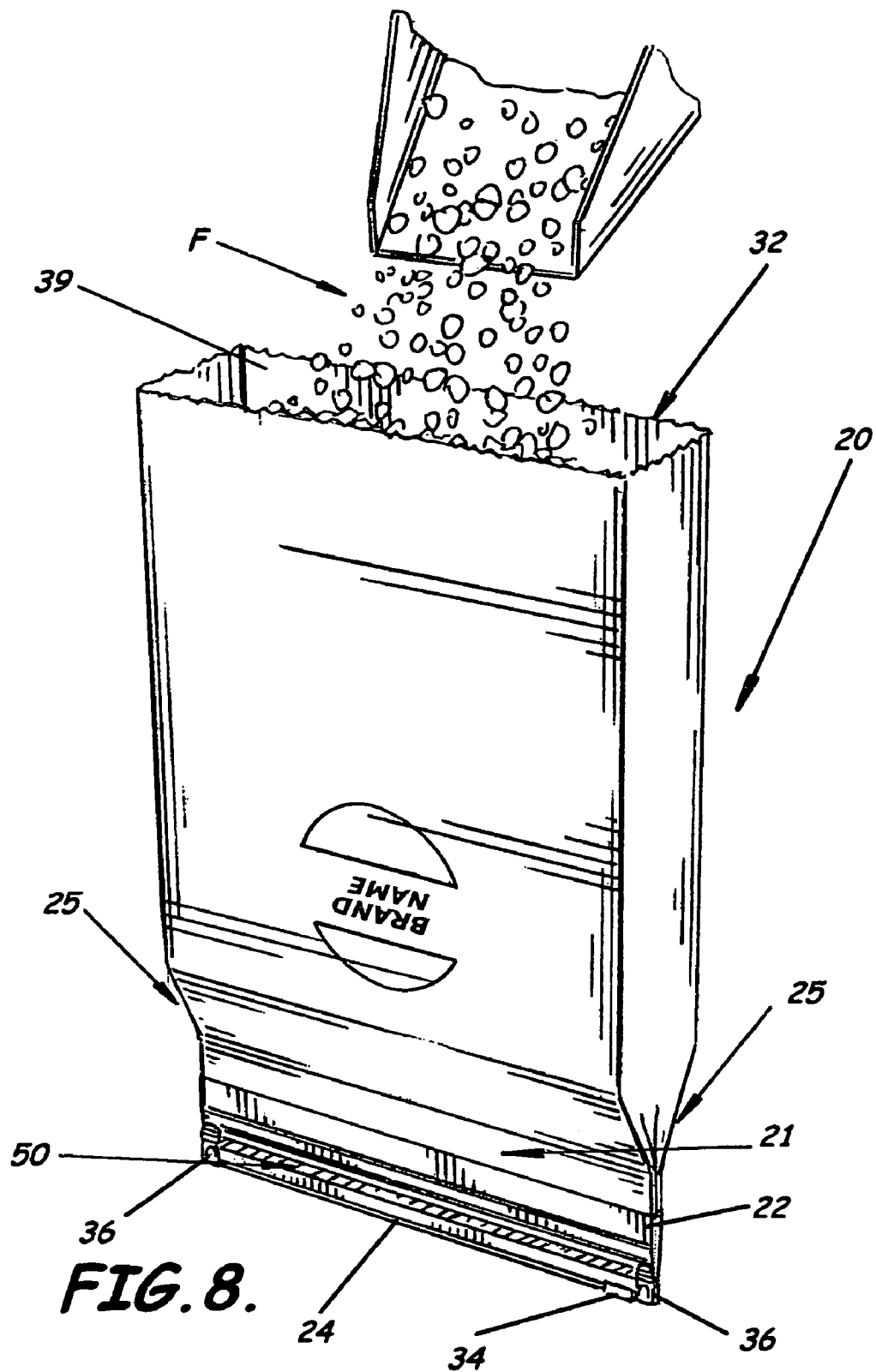
FIG. 8 is perspective view of a multiwall bag being bottom filled with a filling material according to an embodiment of the present invention.

The outer tube 35 can have a plurality of gussets 25 formed between the outer front wall region 33 and the outer back wall region 34. At least a first one of the plurality of gussets 25 is preferably formed in a first region between the outer front and back wall regions 38, 39 so as to define a first outer side wall region. At least a second one of the plurality of gussets 25 is preferably formed in a second region between the outer front and back wall regions 38, 39 so as to define a second outer side wall region positioned opposite the first outer side wall region (see, e.g., FIGS. 3-4). The bag 20 further can have an adhesive material 49 positioned adjacent the plurality of gussets 25 so that when the heat seal is formed, the adhesive material 49 also is reheated to thereby enhance sealing adjacent the gussets 32, such as when passing through the nip of a heat sealer as shown in FIG. 4, and thereby define a plurality of sealed gussets 32 to increase drop and abuse resistance of the bag 20 by strengthening the regions around the gusset and allowing the bag to flex when contents are positioned therein. This enhanced sealing of the gussets can also advantageously reduce the risk of access to contents of a bag 20 by a pest and can also reduce sifting of filling material when positioned in the bag 20.

The fin member 22 of the zipper and fin combination can include a fin seal zone associated with and positioned between the pair of fin strips 28, 29 and positioned adjacent the open end 31 of the outer tube 35 proximal to the zipper track 24. In all embodiments of the present invention, the fin seal zone preferably includes a score line 50 that is positioned between the fin strips 28, 29, as illustrated in FIGS. 10 and 11. The score line 50 ensures that an initial opening of the zipper track 24 allows the fin seal zone to be readily separated in the proper location to provide access to the filling material and inner contents of the bag 20.

Figure 14:
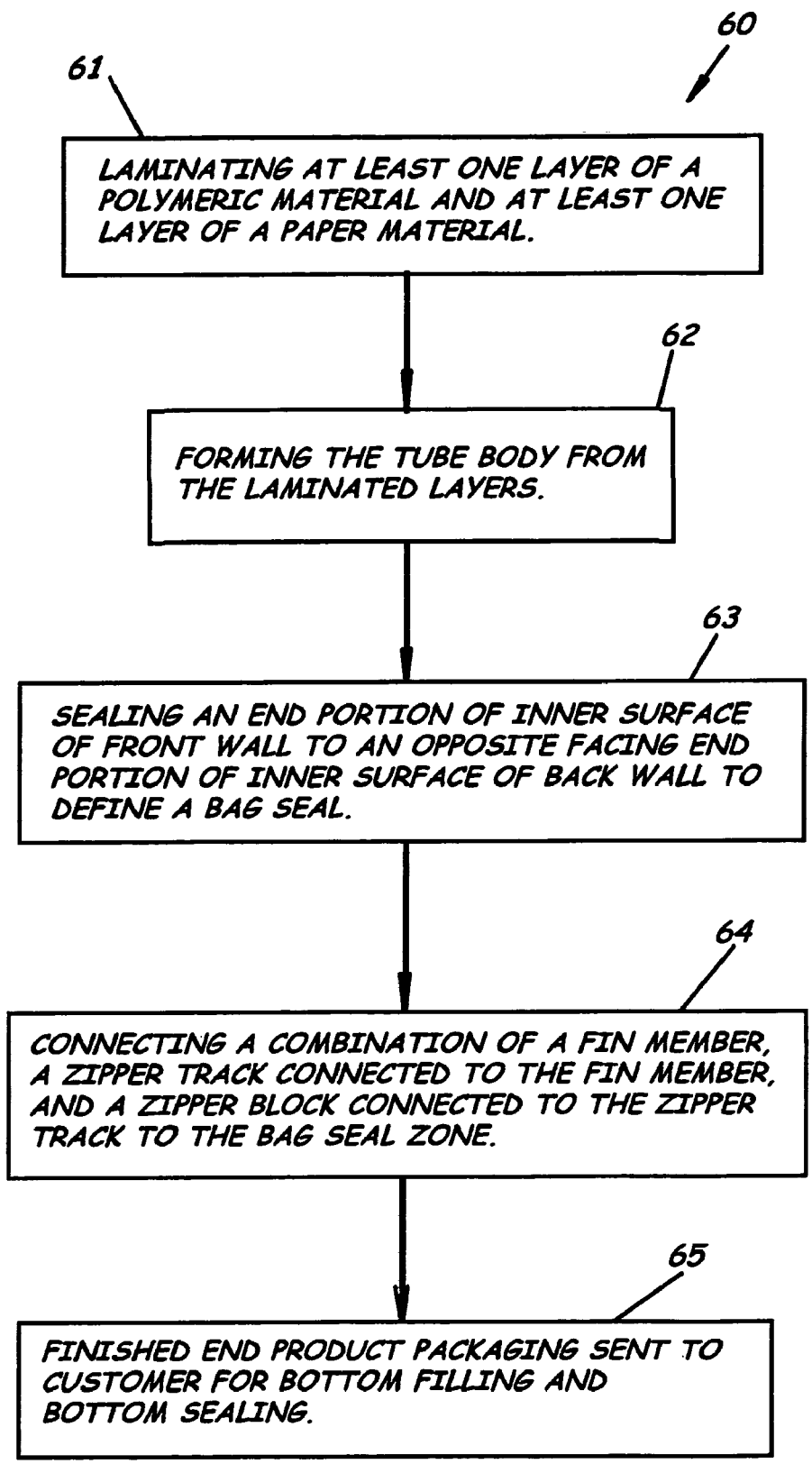
FIG. 14 is a flow diagram of a method of producing a multiwall bag according to the present invention.

As shown in FIGS. 1-14, in addition to the multiwall bottom fillable bags 20, the present invention also advantageously provides a method of forming a multiwall bag 20 having a zipper associated therewith. The method 60 of forming the multiwall bag 20 includes laminating a plurality of layers 41, 42, 46, 47, 48 of material (block 61) (see FIGS. 3-4 and 14). The plurality of layers 41, 42, 46, 47, 48 preferably includes at least one layer 41 of polymeric material and at least one layer 46 of paper material. Once the layers 41, 42, 46, 47, 48 of material are laminated, the layers 41, 42, 46, 47, 48 are formed into a tube body 40 (block 62). The at least one layer 41 of the polymeric material defines an inner surface of the tube body 40 and the at least one layer 46 of paper material defines an outer surface of the tube body 40. The tube body 40 has a front wall and a back wall positioned to face opposite the front wall. An end portion of the inner surface of the front wall is sealed to an opposite facing end portion of the inner surface of the back wall to thereby define a bag seal zone 21 (block 63). A combination of a fin member 22, a zipper track 24 connected to the fin member 22, and a zipper block 34 connected to the zipper track 24 is connected to the bag seal zone 21 (block 64). The finished or end product packaging can then be sent to a customer for bottom filling and bottom sealing (block 65) or such filling and sealing of the bag 20 can be performed on site if desired.

The method of forming the multiwall bag 20, for example, can be altered by supplying layers of materials that are already laminated. If the materials are already laminated, then the tube body can be formed without having to laminate the materials.

In addition to the steps described, the method of forming can include applying an adhesive material 49 in regions of the tube body 40 between peripheral side edges of the front and back walls to form a plurality of gussets 25 in the tube body 40 extending between the front wall and the back wall to thereby define a pair of gusseted side walls. Heat can then be applied to at least one of the respective end portions 31, 32 of the front and back walls of the tube body 40 and positioning the inner surfaces of the respective end portions of the front and back walls to abuttingly contact each other so that the inner surfaces of the front and back walls adhere to each other and form a seal therebetween. The adhesive material 49 on outer surfaces of end portions of the pair of gusseted side walls is reactivated when heat is applied to at least one of the respective end portions of the front and back walls and holding the gusseted side walls to also form a seal in the gusseted side walls so that the sealed gusseted side walls can further define a portion of the bag seal zone 21 if desired. For example, as will be understood by those skilled in the art, the adhesive material can be applied to an outer surface of the tube body and allowed to dry. The adhesive material can be reactivated during application of a heat seal such as in a bottomer or bottom forming machine as understood by those skilled in the art. End portions of the gussets can then be sealed by use of the reactivated adhesive as the gussets pass through a nip or nip region of a machine which applies contact pressure on the end portions of the gussets.

The sealed end portion of the tube body 40 preferably includes a first end portion and a second end portion. The tube body 40 is preferably filled with a filling material F through the second end portion when the first end portion is sealed so that the bag seal zone 21 operates as a stop to flow of filling material into the tube body or as a constructive bottom (see FIG. 8). This, for example, can advantageously prevent contact of the filling material F within the tube body with the zipper track 24 and zipper block 34. The second end portion is then closed after the tube body is filled with a desired quantity of filling material F (see FIG. 9).

Embodiments of the present invention also provide an additional methods of using or additional steps to the forming methods described herein. The zipper block 34, for example, can be positioned in an open position. The zipper track 24 is then separated to provide access to inner portions of the tube body 40. Also, separation of a fin seal zone can be performed by separating the fin strips 28, 29 along a score line 50 such as formed with a laser or other device as understood by those skilled in the art. The inner surface of the front wall is then pealingly separated from the inner surface of the back wall in the bag seal zone 21 without causing any damage to the inner surfaces in the bag seal zone 21 (see FIGS. 10-13). This also provides direct access to the contents of the tube body 40.

For example, a method of using a bag 20 can advantageously include filling a bag 20 with product through a first end of the bag 20 and stopping the product from reaching a second end of the bag 20 by a bag seal zone positioned adjacent the second end. The second end has at least a combination of a zipper track and a zipper block positioned on the zipper track, and more preferably a fin member connected to the zipper track as well, connected to the second end so that the bag seal zone operates as a constructive bottom to thereby enhance protection of the combination of the zipper track and the zipper block during filling.

A method of using a bag 20 can also include moving a zipper block positioned on a zipper track to a zipper block open position. The zipper track is connected to a fin member, and the fin member is connected to a sealed end of a bag 20 defining a bag seal zone. The fin member has a fin seal zone positioned between the zipper track and the bag seal zone. The method can further include separating the zipper track to a zipper track open position, separating the fin seal zone along a score line formed therein to provide access to the bag seal zone, and separating the bag seal zone to thereby provide access to contents of the bag.

The combination of the fin member, the zipper track, and the zipper block can be connected to the bag seal zone 21 by several methods. Such methods can include at least one of the following: applying an adhesive material between inner surfaces of the fin member 22 and outer surfaces of the tube body 40 in the bag seal zone 21, adhering the fin member 22 to the tube body 40 between the at least one polymeric layer 41 and the at least one paper layer 46, and adhering the fin member 22 to inner surfaces of the tube body 40. Other methods for connected the combination to the bag seal zone 21 will be known of ordinary skill in the art and are to be considered within the scope of the present invention.

Several advantages exist with the present invention. As a first advantage of the present invention, the bag seal zone 21 of the multiwall bag 20 provides users with an indicator to determine if the bag 20 has already been open. This indication alerts consumers of possible tampering of with the bag 20. The bag seal zone 21 also protects the zipper combination that is used to seal the multiwall bag 20.

As another advantage of the present invention, the multiwall bag 20 is constructed in such a manner to prevent insects from being able to access the contents within the bags. The bag seal zone 21 and the adhesively secured gussets 32 provide additional protection so that insects will not be able to gain access to the interior of the bags.

From the foregoing it will be seen that the invention is well adapted to attain all of the ends and objects hereinabove set forth, together with other advantages that are obvious and that are inherent to the method and product. It will be understood that certain features and sub-combinations are of utility and may be employed without reference to other features and sub-combinations. This is contemplated by and is within the scope of the claims.

Because many possible embodiments may be made of the invention without departing from the scope thereof, it is to be understood that all matter herein set forth or shown in the accompanying specification is to be interpreted as illustrative and not in a limiting sense. It should be apparent to those skilled in the art that the invention is susceptible to various changes without departing from the scope of the invention.

For example, various types of substrates with or without coatings can be used to form the tube body of the multiplayer bag. Suitable substrates and coatings will be known to one skilled in the art. The use of the bottom fillable multiplayer bag with zipper combination can be used for many types of consumer end products, such as candy wrappers, food items, or any type of packaging that needs a strong bag with easy access to the contents of the bags.

That claimed is:

1. A tamper-evident closure for a bag that comprises a tube having at least one layer of polymeric material, the closure comprising:
    a first strip and a second strip at a first end of the bag, the first and second strips configured to transition between an open strip position in which the first and second strips are separated from each other and a closed strip position in which the first and second strips are in abutting contact with each other to thereby form a strip seal; and
    a bag seal zone between a second end of the bag and the first and second strips, wherein the second end of the bag is opposite the first end of the bag, wherein the bag seal zone is closer to the first end of the bag than to the second end of the bag, and wherein the bag seal zone comprises an inner surface of a front wall region of the tube in abutting contact with an inner surface of a back wall region of the tube,
    wherein the at least one layer of polymeric material comprises the abutting inner surfaces of the front and back wall regions, and wherein the abutting inner surfaces comprise a heat seal.

2. The closure of claim 1, wherein the heat seal allows the inner surfaces of the front wall and back wall regions to peelingly separate and unseal the inner surfaces of the front and back wall regions without substantial damage to the inner surfaces when the bag is initially opened.

3. The closure of claim 1, wherein the polymeric material comprises at least one of polyethylene, polypropylene, nylon, ethylene vinyl acetate, ethylene vinyl alcohol, maleic anhydride grafted polyethylenes and propylenes, and polyesters.

4. The closure of claim 1, wherein the at least one layer of polymeric material is formed by at least one of extrusion, co-extrusion, lamination, and coating processes.

5. The closure of claim 1, wherein the heat seal extends substantially the entire lengthwise extent of the bag seal zone and substantially the entire widthwise extent of the bag.

6. The closure of claim 1, wherein the bag seal zone is configured to transition from an initial closed orientation to an open orientation without returning to the closed orientation.

7. The closure of claim 6, wherein the bag seal zone, when in the closed orientation, substantially prevents movement of product from a position between the second end of the bag and the heat seal zone to a position between the heat seal zone and the first and second strips.

8. The closure of claim 7, further comprising a fin member of which at least a portion is disposed between the heat seal zone and the first and second strips, wherein the fin member is configured to transition from a closed orientation to an open orientation.

9. The closure of claim 1, further comprising a fin member of which at least a portion is disposed between the heat seal zone and the first and second strips, wherein the fin member is configured to transition from a closed orientation to an open orientation.

10. The closure of claim 9, wherein the fin member defines a score line along which the fin member is configured to be separated to move to the open orientation.

11. The closure of claim 1, wherein the first and second strips comprise zipper tracks.

12. The closure of claim 11, further comprising a zipper block that is configured to transition the first and second strips between the open strip position and the closed strip position.

* * * * *

US007544403C1

(12) INTER PARTES REEXAMINATION CERTIFICATE (979th)

United States Patent
Hartzell et al.

(10) Number: US 7,544,403 C1
(45) Certificate Issued: *Oct. 27, 2014

(54) BAG HAVING AN IMPROVED HEAT SEAL CLOSURE AND ASSOCIATED METHODS

(75) Inventors: Mark Hartzell, Bloomsburg, PA (US); Alfred A. McLellan, Inman, SC (US); Sarajane Johnson, Simpsonville, SC (US); Roseann Woodham-Grant, Greenville, SC (US); Lesley M. Millslagle, Roebuck, SC (US); Mary K. Cash, Wellford, SC (US)

(73) Assignee: Bank of America, N.A., Charlotte, NC (US)

Reexamination Request:
No. 95/001,640, Jun. 2, 2011

Reexamination Certificate for:
Patent No.: 7,544,403
Issued: Jun. 9, 2009
Appl. No.: 11/265,946
Filed: Nov. 3, 2005

(*) Notice: This patent is subject to a terminal disclaimer.

Related U.S. Application Data

(63) Continuation of application No. 10/290,681, filed on Nov. 8, 2002, now Pat. No. 6,979,482.

(51) Int. Cl.
*B32B 1/06* (2006.01)

(52) U.S. Cl.
USPC .......................................................... 428/34.3

(58) Field of Classification Search
None
See application file for complete search history.

(56) References Cited

To view the complete listing of prior art documents cited during the proceeding for Reexamination Control Number 95/001,640, please refer to the USPTO's public Patent Application Information Retrieval (PAIR) system under the Display References tab.

*Primary Examiner* — Jeffrey L. Gellner

(57) ABSTRACT

A multiwall bag having a slider zipper and fin combination and methods of forming same are provided. The multiwall bag, for example, can include a tube body. A bag seal zone can be formed in the tube body, and a combination fin member, zipper track, and zipper block can be connected to an end of the tube body in the bag seal zone. The other end of the tube body can be filled with product so that the bag seal zone operates as a constructive bottom during filling. Then, the end of the tube body through which product is filled can be closed and sealed to provide a bag filled with product. The method can include forming a tube body, sealing inner surfaces of the tube body to define a bag seal zone, and connecting a combination fin member, zipper track, and zipper block to the bag seal zone.

Attention is directed to the decision of *Exopack-Technology LLC* v. *Graphic Packaging Holding Co. et al.*, 711cv337 (S.C. filed: 2/09/2011) relating to this patent. This reexamination may not have resolved all questions raised by this decision. See 37 CFR 1.552(c) for *ex parte* reexamination and 37 CFR 1.906(c) for *inter partes* reexamination.

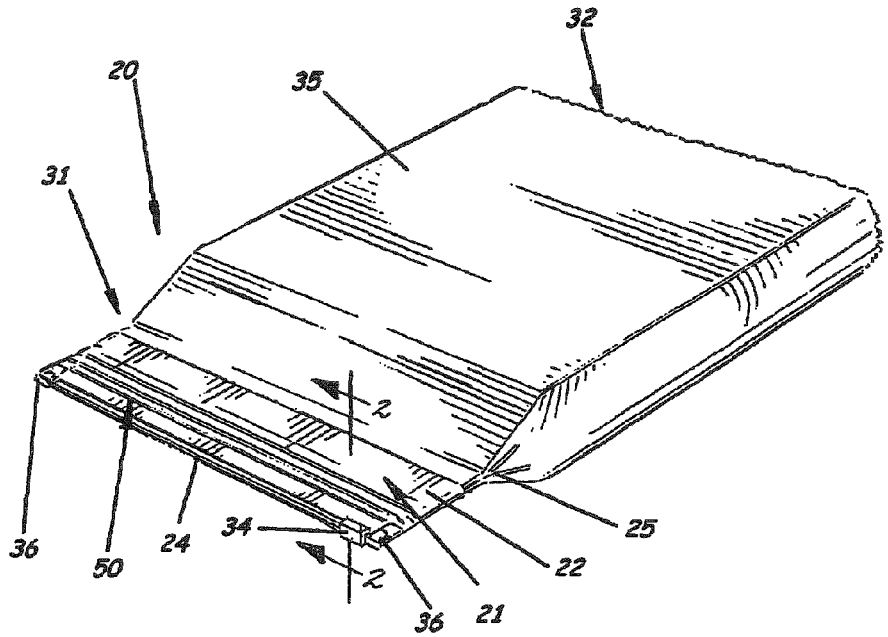

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-12 are cancelled.

New claims 13-15 are added and determined to be patentable.

*13. A tamper-evident closure for a bag that comprises a tube having at least one layer of polymeric material, the closure comprising:*

*a first strip and a second strip at a first end of the bag, the first and second strips configured to transition between an open strip position in which the first and second strips are separated from each other and a closed strip position in which the first and second strips are in abutting contact with each other to thereby form a strip seal; and*

*a bag seal zone between a second end of the bag and the first and second strips, wherein the second end of the bag is opposite the first end of the bag, wherein the bag seal zone is closer to the first end of the bag than to the second end of the bag, and wherein the bag seal zone comprises an inner surface of a front wall region of the tube in abutting contact with an inner surface of a back wall region of the tube,*

*wherein the at least one layer of polymeric material comprises the abutting inner surfaces of the front and back wall regions, and wherein the abutting inner surfaces comprise a heat seal,*

*wherein the bag seal zone is configured to transition from an initial closed orientation to an open orientation without returning to the closed orientation, and wherein the heat seal allows the inner surfaces of the front wall and back wall regions to peelingly separate and unseal the inner surfaces of the front wall and back wall regions,*

*wherein the bag seal zone, when in the closed orientation, acts as a stop to prevent product loaded into the bag from reaching the first end of the bag and continues after loading to substantially prevent movement of product from a position between the second end of the bag and the heat seal to a position between the heat seal and the first end of the bag,*

*wherein the closure further comprises a fin member that comprises a pair of fin strips and a fin seal zone that is associated with and positioned between the pair of fin strips, wherein the fin seal zone can be separated to provide access to inner contents of the bag, and wherein the fin member is attached to the bag seal zone.*

*14. The closure of claim 13, wherein the fin seal zone is at a position between the strip seal and the heat seal.*

*15. The closure of claim 13, wherein the fin seal zone includes a score line along which pair of fin strips can be separated from each other.*

\* \* \* \* \*